J. A. McLEAN.
PANEL SECTION JOINING AND FINISHING FRAME.
APPLICATION FILED MAY 6, 1912.
1,045,996.
Patented Dec. 3, 1912.
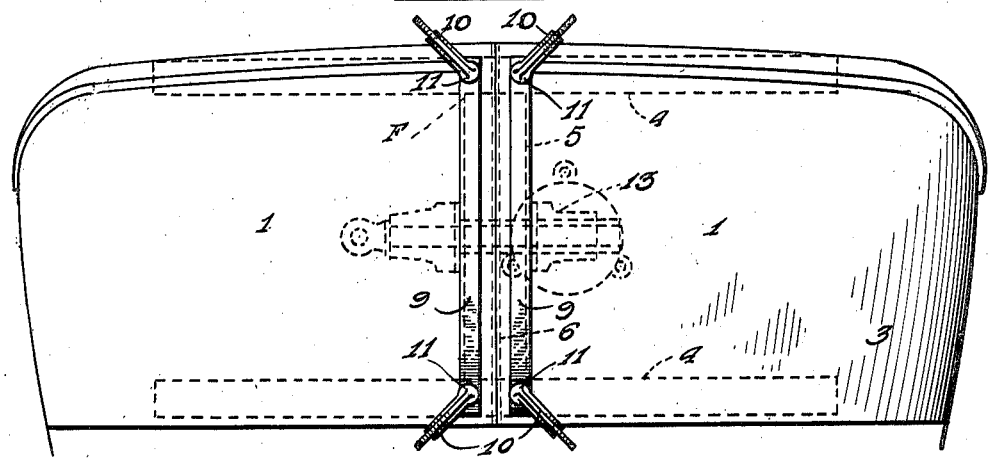
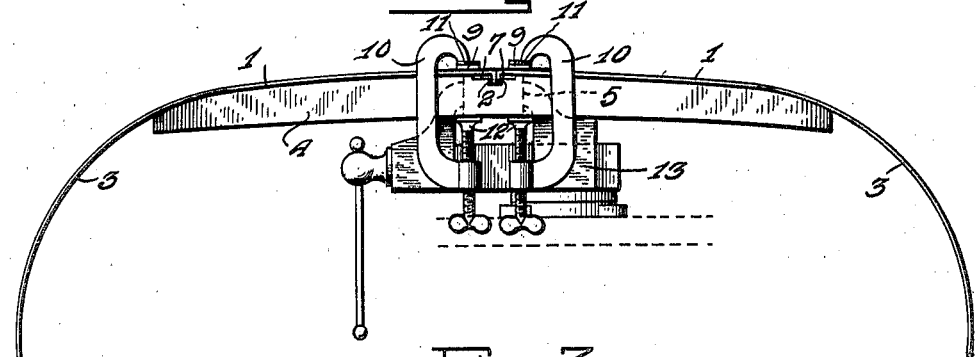
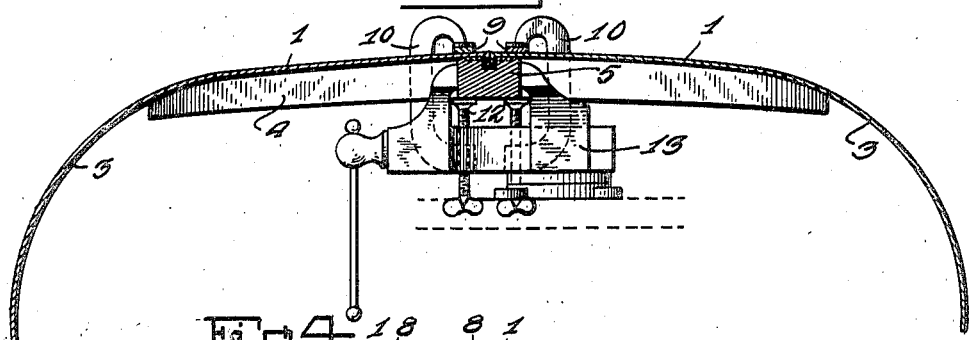
WITNESSES
INVENTOR
James A. McLean,
By P. Singer
Attorney

UNITED STATES PATENT OFFICE.

JAMES A. McLEAN, OF AMESBURY, MASSACHUSETTS.

PANEL-SECTION JOINING AND FINISHING FRAME.

1,045,996.                    Specification of Letters Patent.    Patented Dec. 3, 1912.

Application filed May 6, 1912. Serial No. 695,527.

*To all whom it may concern:*

Be it known that I, JAMES A. McLEAN, a citizen of the United States, residing at No. 56 Market street, Amesbury, in the county of Essex and State of Massachusetts, have invented new and useful Improvements in Panel - Section Joining and Finishing Frames, of which the following is a specification.
My present invention relates to frames for joining and finishing the sections of automobile panels, and is particularly adapted to position and retain the sections in operative relation to each so as to facilitate the joining thereof, by soldering, and finishing the joint in such a manner as to provide an invisible joint at the exterior of the panel. A joint formed by the aid of a frame construction according to my invention, after the panel has received its finishing coat, is not perceivable from the exterior, and therefore gives the appearance of a panel formed of one continuous sheet of metal.

The principal objects of my invention are to provide a frame whereby the automobile panel sections, which are of arched shape, may be quickly and rigidly joined, by soldering, in such a manner as to present an invisible joint, and, to facilitate the handling of such panel sections so as to enable the operator to apply the solder in the most efficient manner.

In the drawings, forming a part of this specification:—Figure 1 is a plan view of two adjacent panel sections positioned by a frame embodying my invention. Fig. 2 is an end elevation of the device as disclosed in Fig. 1. Fig. 3 is a vertical sectional view through the device as disclosed in Fig. 1.
Fig. 4 is a detailed, fragmentary view in vertical section, through the receiving slot and adjacent means for receiving the inturned flanges of the panel sections.

Similar characters refer to similar parts throughout the several views.

Sheet metal sections 1, of which the automobile panel is formed, are provided with inturned flanges 2, disposed at substantially right angles to that portion of the panel in proximity thereto, and when the sections are assembled, these flanges are disposed in abutting relation to each other. The panels have arched portions 3, which are formed to provide the desired contour to the panel portions of the automobile body, and the degree of arching is determined by the design of the automobile.

The frame, designated generally by F, for positioning the panel sections 1 with their flanges 2 in abutting relation to each other, comprises table arms 4, spaced apart from each other by a tie member 5 which is connected to the arms 4 intermediate their ends, forming a substantially I-shaped frame, as indicated in dotted lines in Fig. 1 of the drawing.

With particular reference to the table arms 4, they are formed at their upper faces complementary to the contour of the panel sections, as clearly shown in Figs. 2 and 3 of the drawing, and the said tie member 5 is flush, at its upper surface, with the said faces of the arms 4. A groove 6 extends longitudinally of and is formed in the upper face of member 5, this groove continuing transversely through the arms 4. I prefer to construct the I-shaped frame F by members 4 and 5, made of wood and for a purpose to be subsequently described, I provide metal facing strips 7 counter sunk in the upper face of member 5, held in place by screws 8, and projecting beyond the walls of the slot 6, as clearly shown in Fig. 4 of the drawing. By this construction, an inverted T-shaped groove is provided which accommodates the said abutting flanges 2 of the sections 1.

With the sections 1 in place, supported by table arms 4 and tie member 5, and the said flanges 2 thereof accommodated by the groove 6, clamp bars 9 are provided to rest upon the plates above the tie member 5 and disposed longitudinally adjacent the space intermediate the separated sections. These clamp bars are held in place by clamps 10, jaws 11 and 12 of which grip the bars and hold them tightly against the panel sections 1, intermediate the upper jaws 11 and the frame F. The tie member 5 provides suitable means whereby the frame F is permitted and said tie member may be gripped by a vise 13, or any other suitable device, which will enable the frame to be tilted when such is desired, or the frame rigidly held in a substantially horizontal position.

The operation of the device is as follows: The panel sections having been positioned with the flanges in slightly spaced apart relation to each other, within the groove, and clamped upon the frame, melted solder is poured in the space between the flanges. Under its influence the flanges are drawn together, while the clamp bars 9 prevent any material bodily movement of the sections. The strips 7 prevent the spreading of the sections at the portion of the joint formed, where neatness is most desirable, while the enlarged portion of the groove, that is, the head of the T-shaped groove, permits slight expansion of the flanges. As the solder cools, the flanges contract and the sections are firmly fastened together and efficiently held by the solder interposed between the flanges. Before removing the joined panel from the frame, by means of a file, grind wheel, or buffer, the solder protruding beyond the outer face of the panel may be removed and the surface made smooth and flush with the adjacent surface of the sections. Because of the contraction of the flanges, when the solder is cool, the panel may be easily removed from the frame when the clamps 10 and bars 9 are loosened.

When curved portions of the panel are to be joined, the frame F may be tilted as the solder is poured in and may be tilted sufficiently to permit the solder to flow in place between the flanges, by gravity, but not fast enough to become thin at any portion of the joined elements.

From the foregoing, it is made manifest that I provide means facilitating the joining of automobile panels by which a secure invisible joint may be made between the sections, and, because of the coaction of parts and the action of the joining means upon the panel sections, a joint free from flaws is provided.

I claim:—

1. In joining and finishing frames for vehicle panel sections, having inturned marginal flanges, the combination of table arms having their upper surfaces formed complementary to the contour of the panel sections, a tie member joining said table arms intermediate their ends, said tie member having an inverted T-shaped groove extending longitudinally thereof and continuing transversely through said table arms, for the reception of the flanges of the panel sections, and clamping means for retaining said sections in predetermined relation to each other upon said frame, substantially as and for the purpose set forth.

2. In joining and finishing frames for vehicle panel sections having inturned marginal flanges, the combination of table arms spaced apart from each other and having their upper surfaces formed complementary to the contour of the panel sections, a tie member joining said table arms intermediate their ends, said tie member having a groove extending longitudinally thereof and continuing transversely through said table arms, for the reception of the flanges of the panel sections, and clamping means for retaining said sections upon said tie member with their flanges positioned in predetermined relation to each other in the said groove thereof, substantially as and for the purpose set forth.

3. In joining and finishing frames for vehicle panel sections having inturned marginal flanges, the combination of a substantially I-shaped frame formed with its face complementary to the contour of the panel sections and having an inverted T-shaped groove extending longitudinally of the tie portion of the frame at the face thereof, said groove accommodating the flanges of the panels, and clamping means for retaining said sections in predetermined relation to each other upon said frame, substantially as and for the purpose set forth.

4. In joining and finishing frames for vehicle panel sections having inturned marginal flanges, the combination of a substantially I-shaped frame formed with its upper face complementary to the contour of the panel sections and having a groove extending longitudinally of the tie portion of the frame at the face thereof, said groove accommodating the flanges of the panels, and clamping means for retaining said sections upon said frame with their flanges positioned in predetermined relation to each other in the said groove thereof, substantially as and for the purpose set forth.

5. In joining and finishing frames for panel sections, having inturned marginal flanges, the combination of supporting means for the panel sections having its receiving face formed complementary to the contour of the sections, and an inverted T-shaped elongated groove disposed in the said receiving face of said supporting means for the reception of the flanges of the panel sections, and clamping means for retaining said sections upon said supporting means with their flanges in predetermined relation to each other in said groove, substantially as and for the purpose set forth.

6. In joining and finishing frames for vehicle panel sections, having inturned marginal flanges, the combination of supporting means for the panel sections having its receiving face formed complementary to the contour of the sections, and an elongated groove having its walls in rigid spaced apart relation to each other, for the reception of the flanges of the panel sections, and clamping means for retaining said sections upon the supporting means with their flanges in predetermined relation to each other, in said groove, substantially as and for the purpose set forth.

In testimony whereof I affix my signature in presence of two witnesses.

JAMES A. McLEAN.

Witnesses:
  ROBERT C. CLARK,
  RAYMOND J. HOITT.